(12) United States Patent  
Fang et al.

(10) Patent No.: US 7,935,164 B2
(45) Date of Patent: May 3, 2011

(54) VORTEX AIR-OIL SEPARATOR SYSTEM

(75) Inventors: Ning Fang, West Chester, OH (US);
Duane Howard Anstead, Fairfield, OH (US); Robert Proctor, West Chester, OH (US); Pradeep Hemant Sangli, Bangalore (IN); Prasad Laxman Kane, Pune (IN); Gary Paul Moscarino, Cincinnati, OH (US); Bala Corattiyil, Cincinnati, OH (US); Ray Harris Kinnaird, Fort Thomas, KY (US); David William Pugh, Fairfield, OH (US); Mark Eden Zentgraf, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 11/946,111

(22) Filed: Nov. 28, 2007

(65) Prior Publication Data

US 2009/0133581 A1 May 28, 2009

(51) Int. Cl.
*B01D 46/18* (2006.01)
*B01D 46/30* (2006.01)
(52) U.S. Cl. .................. 55/406; 55/DIG. 19; 55/385.3; 55/400; 96/216

(58) Field of Classification Search .................. 55/216, 55/315, 317, 352, 400, 401, 403, 407, 434, 55/434.2, 437, 438, 447, 449, 467, 406, DIG. 19; 96/216

See application file for complete search history.

(56) References Cited

U.S. PATENT DOCUMENTS

| 4,714,139 | A  | * | 12/1987 | Lorenz et al. | ............... 184/6.11 |
| 4,755,103 | A  | * | 7/1988  | Streifinger   | ................... 415/111 |
| 6,033,450 | A  | * | 3/2000  | Krul et al.   | ....................... 55/345 |
| 6,398,833 | B1 | * | 6/2002  | Santerre et al. | ................. 55/409 |
| 6,640,933 | B2 | * | 11/2003 | Henry et al.  | .................... 184/5.1 |
| 7,063,734 | B2 | * | 6/2006  | Latulipe et al. | ................ 96/189 |
| 7,566,356 | B2 | * | 7/2009  | Latulipe et al. | ................ 55/400 |
| 2003/0010572 | A1 | * | 1/2003 | Henry et al.  | .................. 184/5.1 |
| 2005/0211093 | A1 | * | 9/2005 | Latulipe et al. | ................ 95/270 |
| 2006/0248865 | A1 | * | 11/2006 | Latulipe et al. | ............... 55/400 |

* cited by examiner

*Primary Examiner* — Duane Smith
*Assistant Examiner* — Sonji Turner
(74) *Attorney, Agent, or Firm* — Global Patent Operation

(57) ABSTRACT

The present invention provides a vortex generator that may be used in systems for separating oil from air oil mixtures. The vortex generator comprises a rotating disk having a rim having a plurality of passages extending through it and a cavity formed by the rotating disk and a cavity wall wherein a vortex is created when there is a flow through the plurality of passages into the cavity.

20 Claims, 4 Drawing Sheets

VORTEX AIR-OIL SEPARATOR SYSTEM

CROSS REFERENCE TO RELATED APPLICATIONS

This specification is related to and incorporates herein by reference U.S. application Ser. No. 11/946,103, entitled "AIR-OIL SEPARATOR", and U.S. application Ser. No. 11/946,128, entitled "FREE VORTEX AIR-OIL SEPARATOR", which were filed concurrently with this application.

BACKGROUND OF THE INVENTION

This invention relates generally to gas turbine engines and more particularly to a vortex air oil separator system for recovering oil used to lubricate and cool bearings and other components of a gas turbine engine.

Gas turbine engines typically include a core having a compressor for compressing air entering the core, a combustor where fuel is mixed with the compressed air and then burned to create a high energy gas stream, and a high pressure turbine which extracts energy from the gas stream to drive the compressor. In aircraft turbofan engines, a low pressure turbine located downstream from the core extracts more energy from the gas stream for driving a fan. The fan usually provides the main propulsive thrust generated by the engine.

Bearings are used in the engine to accurately locate and rotatably mount rotors with respect to stators in the compressor and high and low pressure turbines of the engine. The bearings are enclosed in oil-wetted portions of the engine called sumps.

In order to prevent overheating of the bearings, lubricating oil and seals must be provided to prevent the hot air in the engine flowpath from reaching the bearing sumps, and lubricating oil flows must be sufficient to carry away heat generated internally by the bearings because of their high relative speed of rotation and heat load from environment.

Oil consumption arises from the method used to seal the engine sumps. The sealing method makes it necessary for an air flow circuit to exist that flows into and out of the sumps. This flow ultimately contains oil that is unrecoverable unless adequately separated and delivered back to the sumps. In one particular configuration the forward engine sump is vented through the forward fan shaft and out of the engine through a center vent tube. Once the air/oil mixture exits the sump, it swirls, depositing oil on the inside of the fan shaft. Oil that is contained in the air/oil mixture is lost when it is unable to centrifuge back into the sump through the vent hole due to rapidly escaping vent air.

Some conventional designs allow for oil recovery by using weep holes, which are passages whose function is to provide a dedicated path for oil to re-enter the sump, integrated into the forward fan shaft design. In other conventional designs, the fan shaft has no dedicated weep holes, only vent holes. Some conventional designs use a weep plug in a rotating shaft that injects the air-oil mixture radially into a chamber for separating the oil and air, and routes the separated oil through a passage in the weep plug. The weep plug allows the air-oil mixture to radially enter a separator cavity through a central passage in the weep plug. As the air-oil mixture swirls down to a lower radius centrifugal forces drive the more massive oil particles back to the inside diameter of the shaft, while the air escapes through the vent exit. However, air-oil separation is very poor in these conventional designs in cases where the axial distances are short between the radial entrance locations and the air vent entrances. Due to the high radial momentum of the air-oil mixture entering the chamber through the vent holes or the weep plugs, and the short axial distance to the vent exit, the dwell time for vortex motion of the air-oil mixture is short. It has been found that without adequate dwell time for vortex motion, oil separation from the air-oil mixture will be poor. The bearings normally operate at high loads and speeds and, as a result, usually run at high temperatures. The lubrication oil that is supplied provides cooling to the bearings. However the air-oil mixture that is formed in the sump acquires a high temperature. It is more difficult to separate the oil from the air-oil mixture at higher temperatures.

It is desirable to have an air-oil separator system that reduces the radial momentum and increases tangential momentum of the air-oil mixture. It is desirable to have an air-oil separator that is effective in removing oil in engine systems which have sumps that are axially short. It is desirable to have a vortex air-oil separator system with increased dwell time at larger radii for the vortex motion of the air-oil mixture. It is desirable to have a vortex air-oil separator system that can cool the air-oil mixture prior to separating the oil from the air-oil mixture.

BRIEF DESCRIPTION OF THE INVENTION

The above-mentioned needs may be met by a vortex generator that can be used in systems for separating oil from air oil mixtures. The vortex generator comprises a rotating disk having a rim having a plurality of passages extending through it and a cavity formed by the rotating disk and a cavity wall wherein a vortex is created when there is a flow through the plurality of passages into the cavity.

BRIEF DESCRIPTION OF THE DRAWINGS

The subject matter which is regarded as the invention is particularly pointed out and distinctly claimed in the concluding part of the specification. The invention, in accordance with preferred and exemplary embodiments, together with further objects and advantages thereof, is described in the following detailed description taken in conjunction with the accompanying drawings in which:

DETAILED DESCRIPTION OF THE INVENTION

Figure 1:
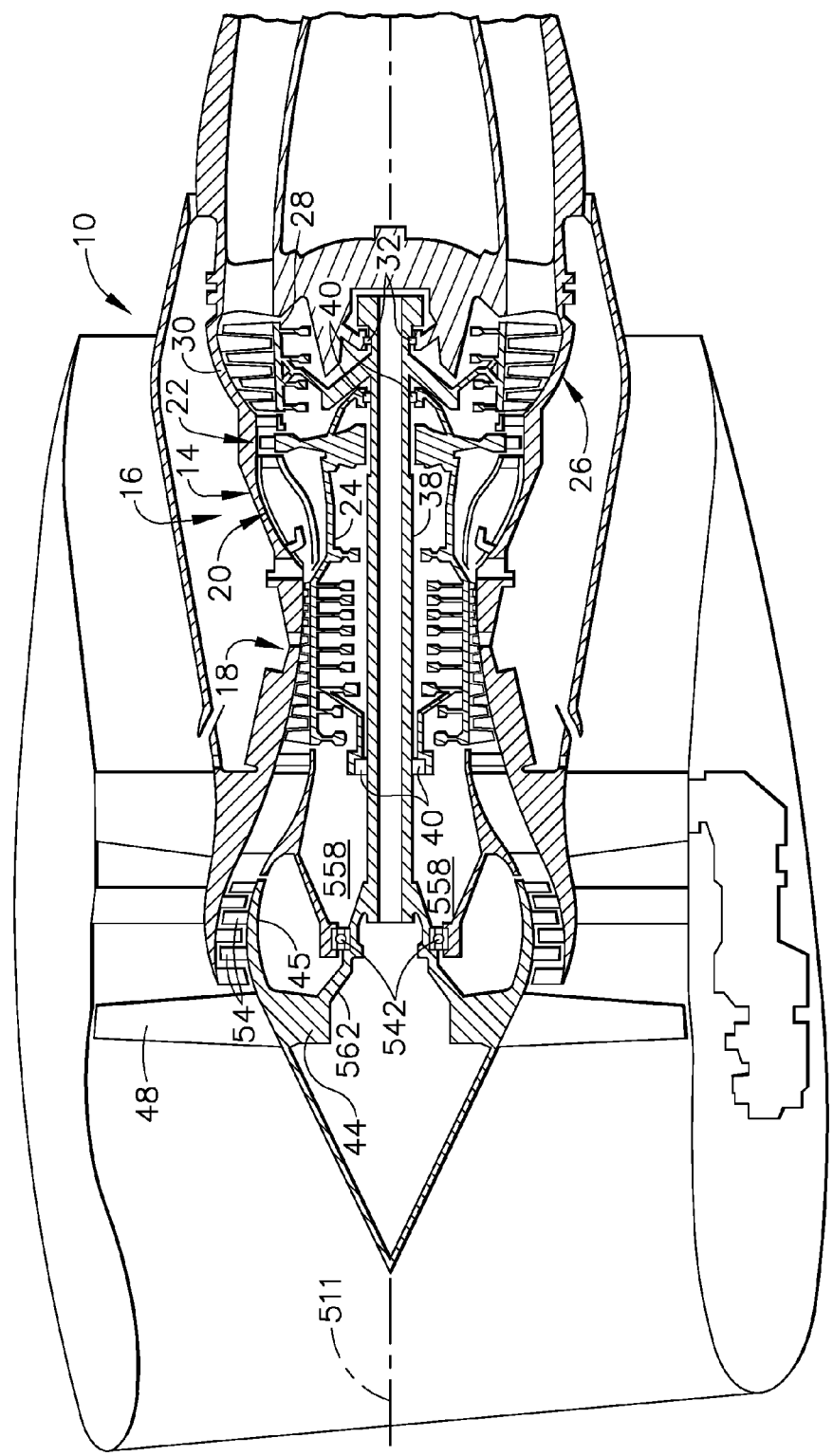
FIG. 1 is a longitudinal axial sectional view of a gas turbine engine.

Referring to the drawings wherein identical reference numerals denote the same elements throughout the various views, FIG. 1 illustrates a gas turbine engine, generally designated 10, incorporating an exemplary embodiment of a vortex air-oil separator system of the present invention. The engine 10 has a longitudinal centerline or axis 511 and an outer stationary annular casing 14 disposed concentrically about and coaxially along the axis 511. The engine 10 includes a gas generator core 16 which is composed of a multi-stage compressor 18, a combustor 20, and a high pressure turbine 22, either single or multiple stage, all arranged coaxially about the longitudinal axis or center line 511 of the engine 10 in a serial, axial flow relationship. An annular outer drive shaft 24 fixedly interconnects the compressor 18 and high pressure turbine 22.

The core 16 is effective for generating combustion gases. Pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core 16 into a low pressure turbine 26.

An inner drive shaft 38 is mounted for rotation relative to the outer drive shaft 24 via rear bearings 32, bearings 40, and via suitable forward bearings 542 interconnected to the outer stationary casing 14. The inner drive shaft 38, in turn, drives a forward fan shaft 562, which in turn drives a forward fan rotor 44 and, in some cases, a booster rotor 45. Fan blades 48 and booster blades 54 are mounted to the fan rotor 44 and booster rotor 45 for rotation therewith.

Figure 2:
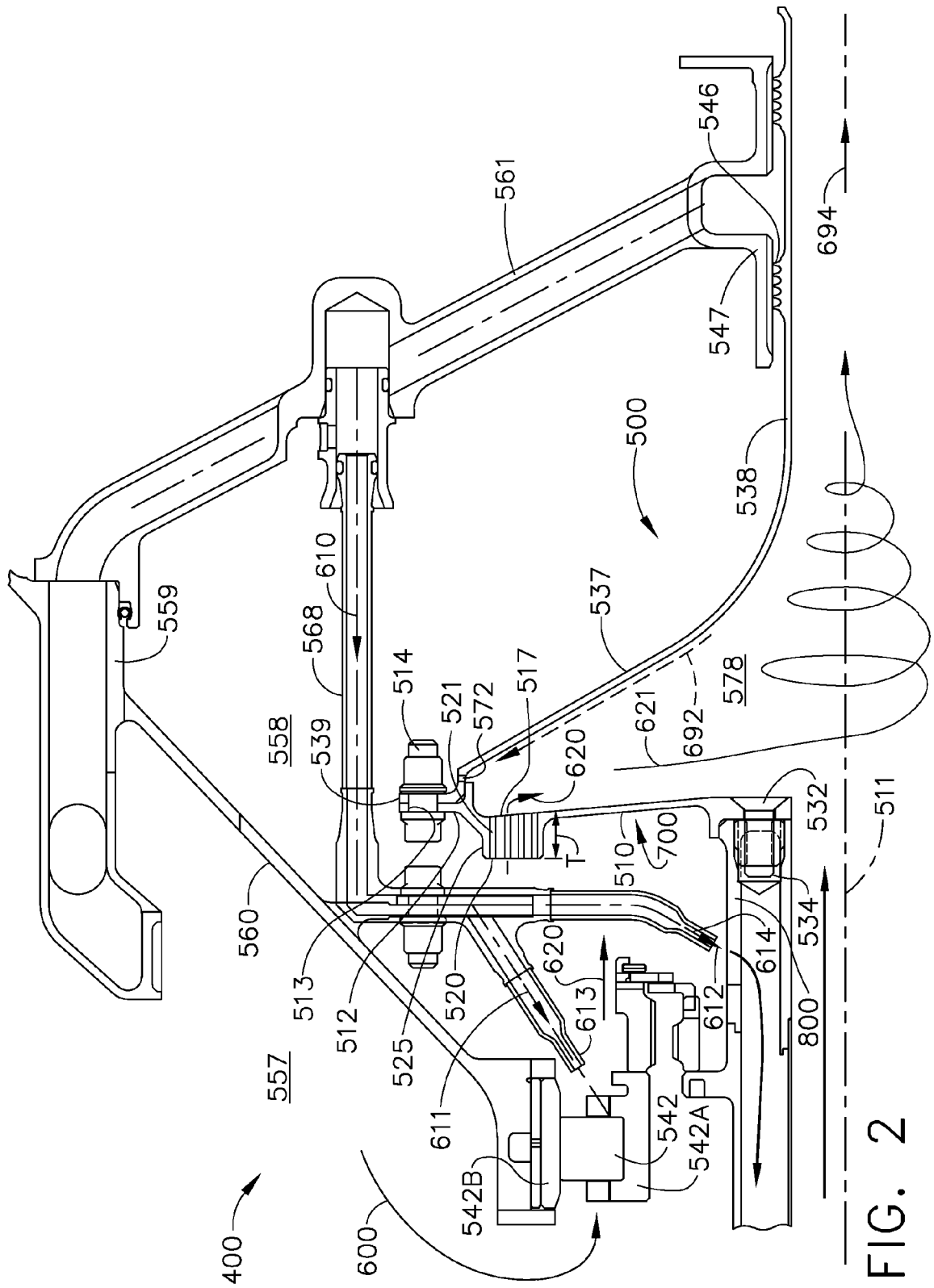
FIG. 2 is an enlarged axial sectional view of a bearing-sump region of a gas turbine engine of FIG. 1, incorporating an exemplary embodiment of a vortex air-oil separator system of the present invention.

Referring to FIG. 2, there is illustrated the region of the gas turbine engine 10 where a bearing sump 558 is defined about the forward bearings 542. The bearing sump 558 is generally defined by an outer annular structure 560 which is interconnected to a static frame 559, a sump cover 561, a forward fan shaft 562, an inner drive shaft 538 and a vortex generator 700. The forward fan shaft 562, being connected with an inner annular race 542A of the forward bearings 542, rotates with the inner drive shaft 538 relative to the stationary outer annular structure 560 which is connected to an outer annular race 542B of the forward bearings 542. Although only one type of bearing is shown in FIG. 2 (see item 542), it is possible to have additional bearings (not shown) mounted on an LP shaft, the forward fan shaft 562 or the inner drive shaft 538 to support the fan and booster rotors or the compressor rotor in the engine. Additional oil supply conduits (not shown), similar to 568 shown in FIG. 2, can provide the oil supply to these additional bearings.

Bearing lubrication oil 610 is pumped into the sump 558 through an oil supply conduit 568. A bearing lubrication oil stream 611 is directed to the forward bearings 542 by a nozzle 613. Additional oil streams, such as for example, shown as item 612 in FIG. 2, are directed at other locations in the sump. Conventional circumferential labyrinth or carbon air and oil seals, such as shown as item 546 in FIG. 2, are provided adjacent to the rotating and static parts to seal the bearing sump 558 to maintain appropriate pressure inside the bearing sump and to prevent the air-oil mixture from escaping from the sump. Pressurized air 600 is injected from a pressurized air cavity 557 which receives air from an air supply system (not shown) in order to prevent oil from leaking through the oil seals. Labyrinth seals, such as shown as item 546 in FIG. 2, between the inner drive shaft 538 and the static structure 547 prevent leakage of oil from the aft end of the bearing sump 558.

A portion of the injected pressurized air 600 which enters the bearing sump 558 must be vented from the sump 558 in a controlled manner in order to maintain sump pressure at a proper balance. However, the pressurized air becomes mixed with particles of the oil in the sump 558. The air-oil mixture in the bearing sump 558 is shown as item 620 in FIG. 2. A significant loss of oil will occur if the air-oil mixture 620 is vented out without separating and removing the oil particles.

An exemplary embodiment of a system for reducing oil consumption in aircraft engines by using a vortex air-oil separator for separating oil from an air-oil mixture is shown in FIG. 2. The system comprises an oil supply conduit 568 through which flows an oil supply 610 into the sump. In order to prevent the leakage of oil from the system, pressurized air 600 is passed from the pressurized air cavity 557 through seals into the sump 558. In the exemplary embodiment shown, a vortex generator 700 is rigidly connected to the forward fan shaft 562 by fasteners 532 that are fastened to corresponding holes 534 in the forward fan shaft 562. The vortex generator 700 is also rigidly connected to the forward end of the inner drive shaft 538 by fasteners 512. Although these connections are shown in FIG. 2 using fasteners, any other suitable conventional means of attachment can also be used.

The exemplary embodiment of a vortex air-oil separator system further comprises a separator cavity 578 wherein the separation of the oil particles from the air-oil mixture takes place, as explained further below. The separator cavity 578 is defined by the vortex generator 700 and a suitably shaped cavity wall 537. The cavity wall 537 can be integrally formed with the forward inner drive shaft 538 as shown in FIG. 2. Alternately, the cavity wall 537 can be made separately and then attached to the forward end of the inner drive shaft 538 using conventional attachment means. The oil particles 692 that are separated move radially out along the inner side of the separator cavity wall 537 and flow out of the separator cavity through orifices 572 formed in the radially outer regions of the separator cavity wall 537. The air is vented through interior of the inner drive shaft 538. Conventional vent tubes (not shown) may also be used for this purpose.

Figure 3:
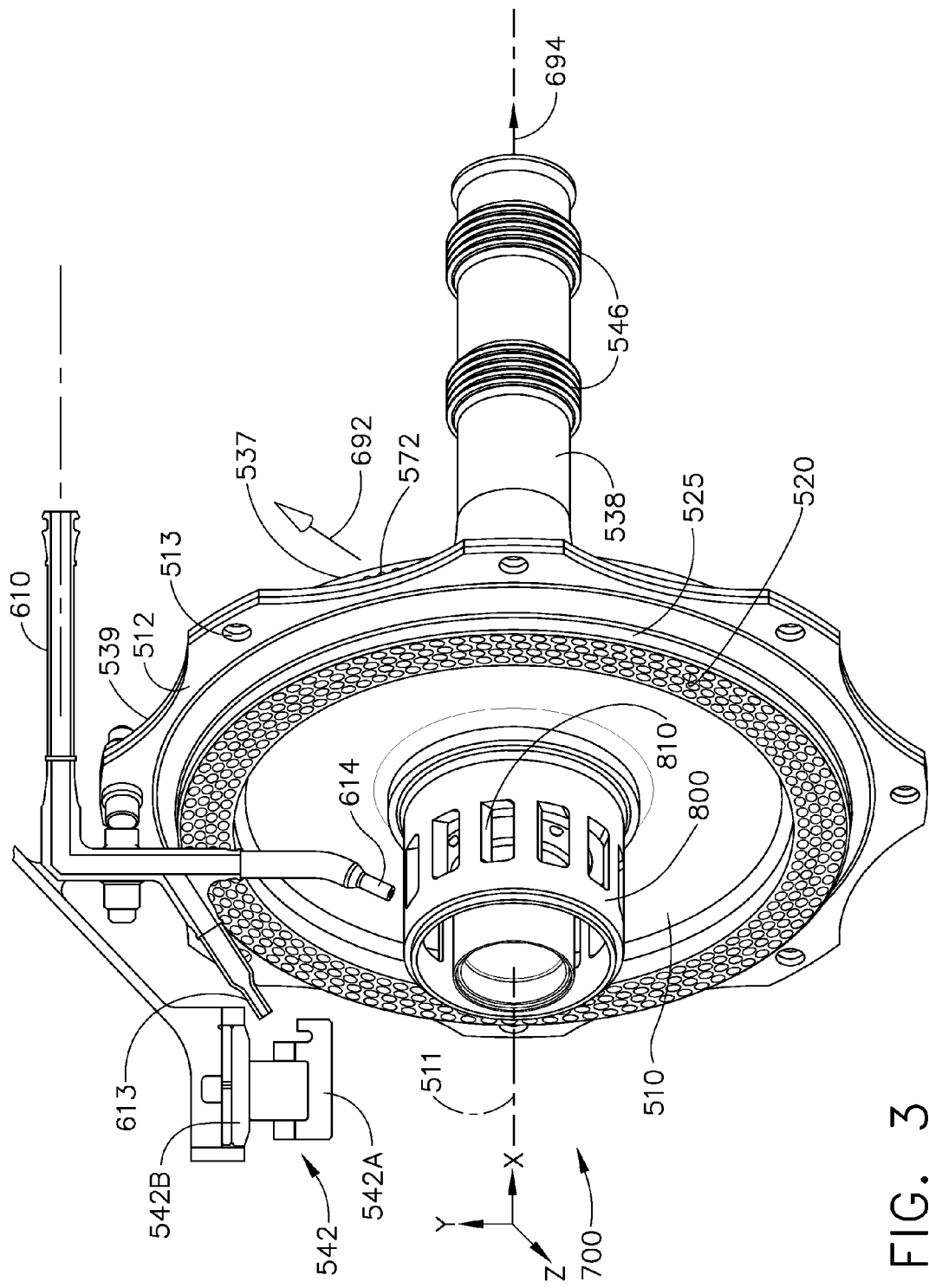
FIG. 3 is a perspective view showing an exemplary embodiment of a vortex generator of the present invention.
Figure 4:
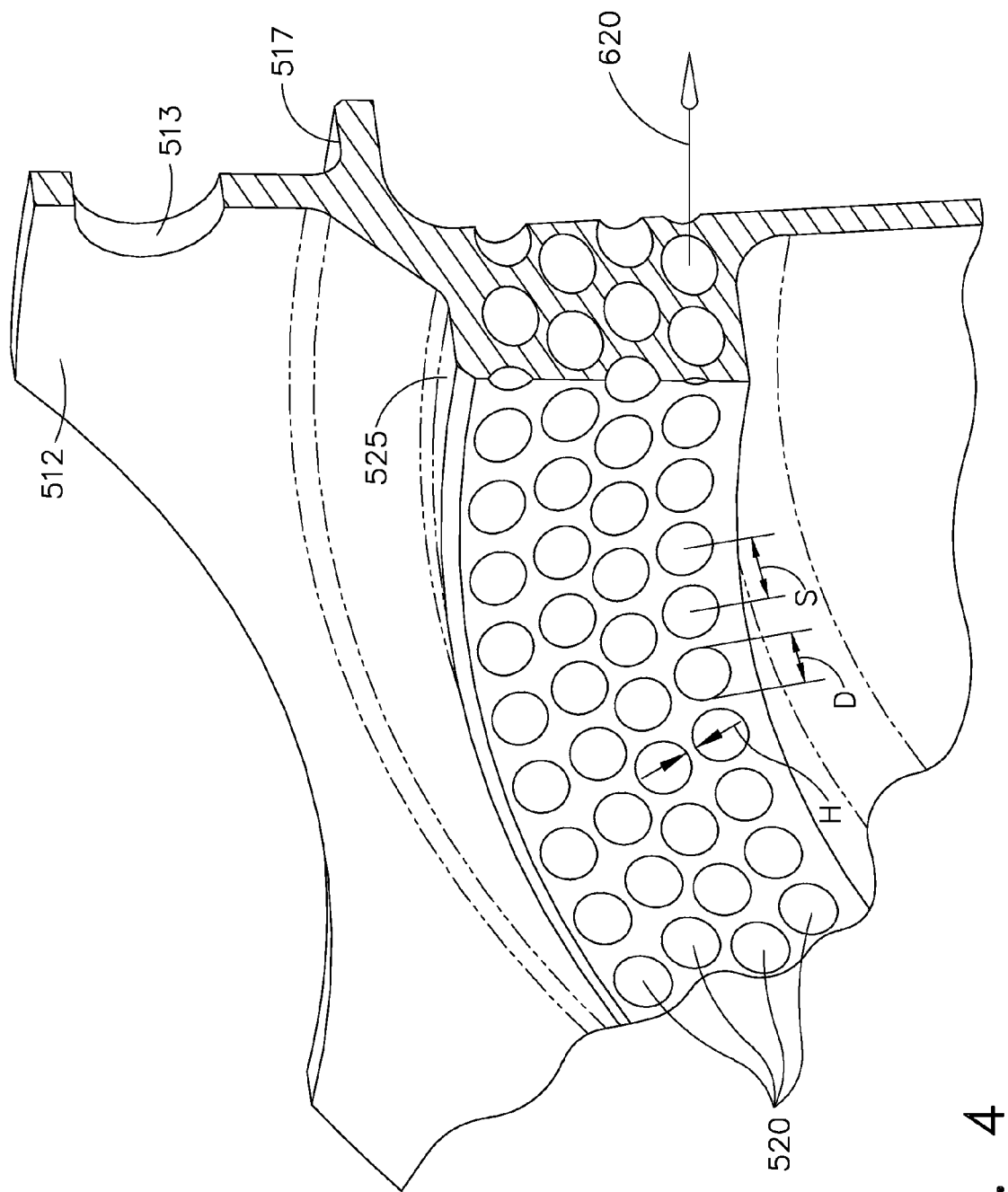
FIG. 4 is a perspective view showing a cross section of the vortex generator shown in FIG. 3.

The rotating vortex generator 700 receives the air-oil mixture 620 from the sump 558 and flows it into the separator cavity 578, creating a vortex 621 in the separator cavity. An exemplary embodiment of a vortex generator 700 is shown in FIG. 3. The vortex generator 700 has a disk 510 that rotates about the centerline 511. It has a rim 525 located in a radially outer region 517. The vortex generator 700 rim 525 has one or more rows of vent holes 520 arranged around the circumference. Passages 521 extend from the vent holes 520 through the thickness of the rim 525. The orientation of these passages is such that the air-oil mixture entering these vent holes from the sump 558 and passing through the passages 521 is redirected in the axial, tangential and radial directions with respect to the centerline 511. Typically there are multiple rows of these holes 520 with each row located at a different radial location. FIG. 4 shows a cross-sectional perspective view of the radially outer region of the vortex separator 700. The vortex generator 700 receives the air-oil mixture flow 620 in a generally axial direction at the entrance to the vent holes 520 and reorients the direction of its flow within the vortex generator 700 towards the tangential direction and injects the air-oil mixture 620 into the separator cavity 578. In the exemplary embodiment shown in FIGS. 2 and 3, the separator cavity 578 is formed between the vortex generator 700 and the cavity wall 537 that is integrally formed with the inner drive shaft 538. The vortex generator 700 and the inner drive shaft 538 are connected using flanges 512 and 539 having a row of corresponding holes 513 and fasteners 514.

In the separator cavity 578, the rotating air/oil mixture vortex 621 swirls down to lower radius as it flows axially towards the air vent. This vortex 621 swirling of the air-oil mixture results in high tangential velocities and centrifugal forces acting on the air and oil particles. These centrifugal forces drive the more massive oil particles radially out (shown as item 692 in FIG. 2) to the inside region of the cavity wall 537.

In one aspect of the invention, the oil particle separation is further improved by optionally cooling the air-oil mixture 620 prior to flowing it into the separator cavity 578. By cooling the air-oil mixture the density of the oil particles is increased, and as a result, the more massive oil particles are more easily removed by the centrifugal forces acting on them in the vortex swirl in the separator cavity 578. One method of cooling the hot air-oil mixture in the sump 558 is by mixing with relatively cooler oil supplied to the sump. This is shown in the exemplary embodiment of the vortex air-oil separator system shown in FIG. 2. In the exemplary embodiment shown therein, relatively cooler oil 612 is supplied through a nozzle 614 that directs the oil stream towards a rotating deflector 800. When the cooler oil stream 612 impinges on the rotating deflector 800, oil droplets are created that mix with the relatively hotter air-oil mixture 620. This results in a relatively cooler air-oil mixture, which is drawn into the vortex generator 700 through vent holes 520. As shown in FIG. 3, in the exemplary embodiment, the deflector 800 is attached to the vortex generator 700 and rotates with it. Any conventional means, such as fasteners, can be used to secure the deflector 800 to the vortex generator 700 and/or the forward fan shaft 562.

The deflector 800 can optionally comprise a selected number of slots/windows through its wall, such as for example, shown as item 810 in FIG. 3, to pass a portion of the oil stream 612 to the interior side of the deflector in order to supply lubricating oil to other bearing locations in the engine. The relative size and spacing of the slots 810 can be tailored to control the amount of oil passing through the wall and the amount of oil that is splashed back into the sump 558 to cool the air-oil mixture 620.

The oil particles separated from the air-oil mixture are removed from the separator chamber 578 by means of grooves and/or holes, such as shown as item 572 in FIG. 2, on the rotating shaft cavity wall 537. The removed oil, shown as item 692 in FIGS. 2 and 3, flows into the sump 558. The air particles are removed from the separator cavity 578 (shown as item 694 in FIG. 2) through a vent exit, such as for example through conventional vent tubes (not shown). Alternatively, oil may be removed from the separator cavity 578 by providing channels on the vortex generator 700 to provide a path for oil to return to the sump 558 without being overwhelmed by the relatively high mass flow rate of air-oil mixture flowing through the inside passages 520 of the vortex generator 700. A conventional scavenge system, (not shown) removes the oil from the sump cavity 558 for further processing before being pumped back into the bearing lubrication system.

As discussed before, dwell time, tangential velocity and temperature are three important factors which determine the effectiveness of vortex separation of the oil particles from the air-oil mixture. The rotating vortex generator 700 increases tangential velocity of the air-oil mixture 620 as it passes through the vent holes 520. The air-oil mixture 621 entering the separator cavity 578 has predominantly tangential and axial, and a smaller amount of radial momentum. The air-oil mixture 621 enters the separator cavity at a radially outer location from the axis of rotation 511. This feature enables a vortex flow 621 that has a larger dwell time for tangential flow at larger radii as compared to conventional designs using vent holes and radial plugs. This is accomplished by turning the flow within the vortex generator 700 vent holes 520 to impart a tangential component of velocity in the direction of rotation. Thus, as the air-oil mixture 620 flows within the vent holes 520, it acquires additional tangential velocity, in addition to that imparted to it by the rotation of the vortex generator 700.

The increase in tangential velocity of the air-oil mixture flow results in a stronger vortex and higher centrifugal acceleration to separate the oil particles from the air/oil mixture in the separator cavity 578. Because the air is injected tangentially at larger radii outer region location, the air/oil mixture 621 follows a much longer path before reaching the vortex separator exit and, therefore, the dwell time for the air/oil mixture is greater than that for conventional configurations.

An exemplary embodiment of the vortex air-oil separator system using a vortex generator 700 is shown in FIG. 2. An exemplary embodiment of vortex generator 700 is shown in FIGS. 3 and 4. In FIG. 3, the X-axis shown represents the axial direction, Y-axis represents the radial direction and the Z-axis represents the tangential direction, positive in the rotational direction of the inner drive shaft 538. In the exemplary embodiment of the vortex generator 700 shown in FIGS. 3 and 4, there are 4 rows of vent holes 520 located around the circumference, with each row having about 100 vent holes. The vent holes 520 have a diameter 'D' of about 0.100 inch and are have a spacing distance 'S' between them, which typically ranges between 0.015 inch and 0.025 inch for the different rows. The spacing 'H' between the rows for the exemplary embodiment shown in FIG. 4 is about 0.020 inch. The thickness T of the rim 525 of the vortex generator 700 is about 0.36 inch. The vent holes 520 receive the air-oil mixture flow 620 in a generally axial direction and reorients the flow direction such that the flow exits the vent holes 520 into the separator cavity 578 in a generally tangential direction along the direction of rotation of the inner drive shaft 538, at an angle A to the tangential axis, Z. In general the orientation angles of the stream of air-oil mixture exiting from the passages 521 is selected to have a tangential component with respect to the Z-axis, an axial component with respect to the X-axis, and a radial component with respect to the Y-axis. In an exemplary embodiment of the present invention, 4 rows of vent holes 520 are used and the angle A is selected to be about 45 Degrees, and the angle B with respect to the axial direction (X axis) is about 45 Degrees.

In an exemplary embodiment of the deflector 800 shown in FIG. 3, the deflector 800 is attached to the vortex generator 700 and rotates with it at a rotational speed of about 3000 to 5000 rpm. The deflector has a wall thickness of about 0.20 inch, and has 12 slots for passing oil to its interior for further supply of lubrication oil to other bearing locations in the engine.

The vortex generator 700 is manufactured from a material which is capable of withstanding the temperatures prevailing in the sump 558, which is approximately 149 Deg. C. (300 Deg. F.), and resisting attack from the engine lubricating oil. Conventional turbine rotor materials, such as Inconel 718, may be used for making the vortex generator 700 and the shafts 538, 562. The vortex generator 700 may be formed by any known method, for example forging followed by machining, or by machining from a blank of material.

It has been found that in general that oil separation efficiency for vortex separators tends to increase with oil particle size, and may approach 100% for large oil particles of 15 microns or higher. However, it has been found using conventional computational fluid dynamic analyses that that embodiments described herein are highly efficient in separating oil particles smaller than 15 microns also. For example, in an aircraft engine under cruise conditions, it has been analytically found that for an oil particle size of 10 microns, the oil separation efficiency using the present invention is more than 95% where as the oil separation efficiency using conventional techniques is less than 20%.

While the invention has been described in terms of various specific embodiments, those skilled in the art will recognize that the invention can be practiced with modification within the spirit and scope of the claims.

What is claimed is:

1. An air-oil separator system comprising:
 a first region having a mixture of air and oil;

a second region wherein separation of at least some of the oil from the air-oil mixture occurs; and a vortex generator adapted to generate a vortex of the mixture of air and oil in the second region, the vortex generator comprising a disk having a rim located in a radially outer region from an axis of rotation, a plurality of passages extending through the rim in flow communication with the first region and the second region, the vortex generator being coupled to a rotating component such that a vortex flow of air-oil mixture is generated in the second region.

2. An air-oil separator system according to claim 1 wherein:

at least some of the passages are oriented such that at least a part of the air-oil mixture discharged therefrom has a component of velocity that is tangential to the direction of rotation of the rotating component.

3. An air-oil separator system according to claim 1 wherein:

at least a part of the second region is enclosed by the vortex generator and a cavity wall that is a portion of the rotating component.

4. An air-oil separator system according to claim 1 wherein:

the rotating component has at least one passage that is in flow communication with the first region and the second region for removing oil from the second region.

5. An air-oil separator system according to claim 1 wherein:

the vortex generator has at least one opening that is in flow communication with the first region and the second region for removing oil from the second region.

6. An air-oil separator system according to claim 1 further comprising:

a deflector attached to the rotating component.

7. An air-oil separator system according to claim 1 further comprising:

a deflector attached to the vortex generator.

8. An air-oil separator system according to claim 6 further comprising:

a nozzle for directing at least a part of a stream of oil on the deflector.

9. An air-oil separator system according to claim 6 wherein the deflector has at least one slot such that at least a part of the stream of oil passes through the slot.

10. A vortex generator comprising:

a rotating disk having a rim located in a radially outer region from an axis of rotation;

a plurality of passages extending through the rim;

a cavity wall;

a cavity formed by the rotating disk and the cavity wall adapted to generate a vortex of a mixture of air and oil in the cavity when there is a flow of the mixture of air and oil into the cavity through the plurality of passages into the cavity.

11. A vortex generator according to claim 10 wherein:

the cavity wall has at least one passage for removing oil from the cavity.

12. A vortex generator according to claim 10 wherein:

at least some of the plurality of passages are oriented at an angle to the axis of rotation.

13. A vortex generator according to claim 10 wherein:

the plurality of passages is arranged in a circumferential direction.

14. A vortex generator according to claim 10 wherein:

the plurality of passages is arranged in a plurality of circumferential rows, each circumferential row being located at a different radial location.

15. A bearing lubrication system comprising:

a bearing;

an oil supply conduit that supplies lubricating oil to the bearing;

a sump cavity having a mixture of air and oil;

a pressurized air cavity located outside the sump cavity;

a separator cavity located inside the sump cavity; and a vortex generator adapted to generate a vortex of a mixture of air and oil in the separator cavity, the vortex generator comprising a disk having a rim located in a radially outer region from an axis of rotation, a plurality of passages extending through the rim in flow communication with the sump cavity and the separator cavity, the vortex generator being coupled to a rotating component such that a vortex flow of air-oil mixture is generated in the separator cavity.

16. A bearing lubrication system according to claim 15 wherein:

the separator cavity has a wall having at least one passage for removing oil from the separator cavity.

17. A bearing lubrication system according to claim 15 wherein:

at least some of the plurality of passages are oriented at an angle to the axis of rotation.

18. A bearing lubrication system according to claim 15 further comprising:

a deflector attached to the rotating component.

19. A bearing lubrication system according to claim 18 further comprising:

a nozzle for directing at least a part of a stream of oil on the deflector.

20. A bearing lubrication system according to claim 19 wherein the deflector has at least one slot such that at least a part of the stream of oil passes through the slot.

* * * * *